(No Model.)
N. W. MUMFORD.
BICYCLE CASE.
No. 542,096. Patented July 2, 1895.
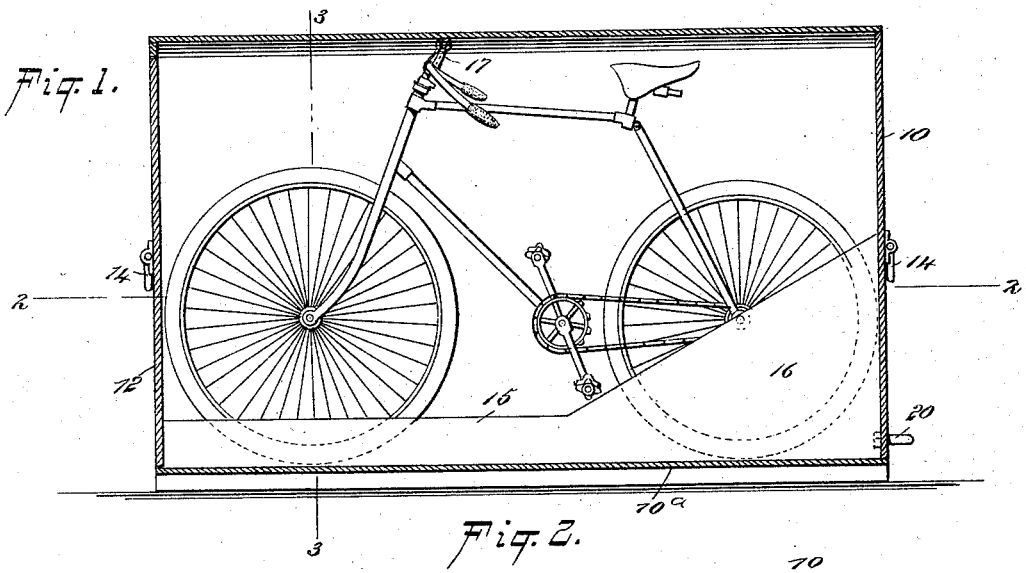
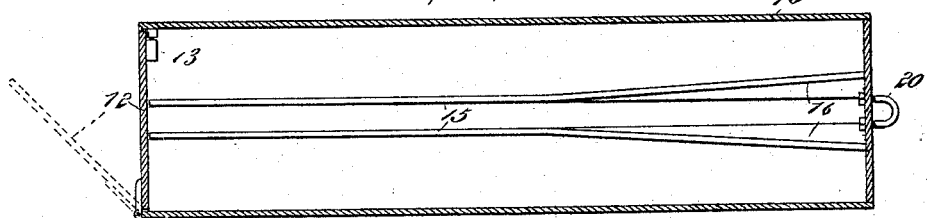
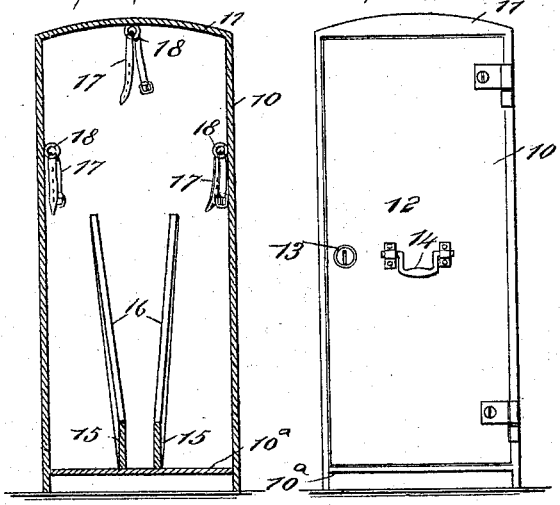 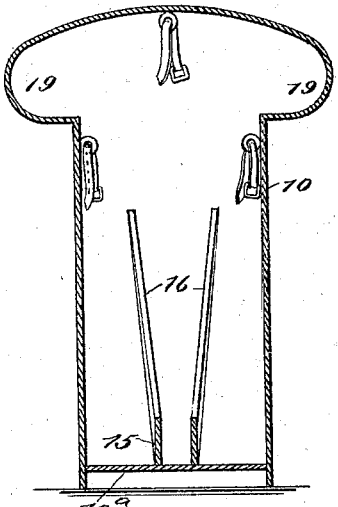
WITNESSES:
William Goebel.
W. B. Hutchinson
INVENTOR
N. W. Mumford
BY Munn & Co
ATTORNEYS.

UNITED STATES PATENT OFFICE.

NORMAN W. MUMFORD, OF JAFFERY, FLORIDA.

BICYCLE-CASE.

SPECIFICATION forming part of Letters Patent No. 542,096, dated July 2, 1895.

Application filed February 19, 1895. Serial No. 538,943. (No model.)

*To all whom it may concern:*

Be it known that I, NORMAN W. MUMFORD, of Jaffery, in the county of Volusia and State of Florida, have invented a new and Improved Bicycle-Case, of which the following is a full, clear, and exact description.

Every one who has ever owned a bicycle appreciates the nuisance of having to lug the bicycle into and out of the house or other building whenever the machine is used; and the object of my invention is to obviate this inconvenience and produce a very cheap and simple case, in the form of a closed structure, which is adapted to hold the bicycle in an upright position, which can be conveniently handled and transported, which is practically burglar-proof and also protects the bicycle from the weather, which is adapted to be locked securely to a building or other fixture, and which is constructed in such a way that the bicycle may be very easily placed in it or removed from it.

To these ends my invention consists of certain features of construction and combinations of parts, which will be hereinafter described.

Reference is to be had to the accompanying drawings forming a part of this specification, in which similar figures of reference indicate corresponding parts in all the views.

Figure 1 is a central vertical section of my improved case, showing a bicycle therein. Fig. 2 is a sectional plan on the line 2 2 of Fig. 1. Fig. 3 is a cross-section on the line 3 3 of Fig. 1. Fig. 4 is a front end view of the case, and Fig. 5 is a cross-section of a slightly-modified form of the case.

The case 10 is in the form of a closed box-like structure and is preferably of rectangular form and has a raised bottom $10^a$ to protect the material from moisture, while the roof or top is preferably convex, as shown at 11, in order that it may shed water well. The case has its front end closed by a door 12, which fills the entire end of the case and is fastened by a lock 13. The size of the case is such that when a bicycle is pushed into it the top of the case will be but little above the bicycle top, while the bicycle will extend practically the entire length of the case. The case has at its ends handles 14 to enable it to be easily moved about.

Arranged longitudinally within the case are guides 15, which are placed near the center and are parallel with each other, these guides at their inner ends inclining upward, as shown at 16, so that when a machine is pushed backward into the case the rear wheel will fit snugly between the raised portions 16 of the guide and is thereby securely held.

Within the case and on the top and sides are straps 17, which are preferably held in rings 18, secured to the walls of the case, and these straps are arranged so as to come nearly opposite the handle-bar of the machine when pushed into the case, and by attaching the straps to the handle-bar the machine is held upright and secure. This arrangement is adapted for the machines with narrow handle-bars, but if the wide handle-bars are used the case has side recesses 19 at the top in which the handles may rest.

The case has at its rear end a staple 20, which is fastened securely to the case and to which a chain may be attached and fastened by a padlock to any suitable or convenient fixture.

The case is lined with some suitable material which will render it dust and water proof, and from the above description it will be seen that a bicycle may be very easily pushed into it or removed from it, and that when locked in the case the bicycle is secure and is kept in much better condition than where it is out loose in the way bicycles are usually kept.

Having thus described my invention, I claim as new and desire to secure by Letters Patent—

1. As an improved article of manufacture, a bicycle case consisting of a closed structure having an opening to receive the bicycle, interior supporting devices for the bicycle and guides extending from the opening in the case adapted to guide and hold the bicycle into position to be secured to the supporting devices, substantially as set forth.

2. As an improved article of manufacture a bicycle case consisting of a closed structure having an end door and provided in its interior with parallel guides extending from said door and adapted to receive and guide the wheel of the bicycle, said guides having at one end elevated and outwardly inclined portions, substantially as set forth.

NORMAN W. MUMFORD.

Witnesses:
G. A. BRADDOCK,
C. D. JENKINS.